(12) United States Patent
Boynton et al.

(10) Patent No.: US 10,931,649 B2
(45) Date of Patent: Feb. 23, 2021

(54) SECURE END-TO-END TRANSPORT THROUGH INTERMEDIARY NODES

(71) Applicant: Seven Networks, LLC, Marshall, TX (US)

(72) Inventors: Lee R. Boynton, Lake Oswego, OR (US); Trevor A. Fiatal, Fremont, CA (US); Scott M. Burke, Mountain View, CA (US); Mark Sikes, Ben Lomond, CA (US)

(73) Assignee: Seven Networks, LLC, Marshall, TX (US)

( * ) Notice: Subject to any disclaimer, the term of this patent is extended or adjusted under 35 U.S.C. 154(b) by 0 days.

(21) Appl. No.: 16/998,476

(22) Filed: Aug. 20, 2020

(65) Prior Publication Data

US 2020/0382176 A1 Dec. 3, 2020

Related U.S. Application Data

(63) Continuation of application No. 16/902,325, filed on Jun. 16, 2020, now Pat. No. 10,804,980, which is a
(Continued)

(51) Int. Cl.
*H04L 29/06* (2006.01)
*H04W 12/00* (2021.01)
(Continued)

(52) U.S. Cl.
CPC ........ *H04L 63/0428* (2013.01); *H04L 9/3226* (2013.01); *H04L 63/029* (2013.01); *H04L 63/0272* (2013.01); *H04L 63/0464* (2013.01); *H04L 63/0471* (2013.01); *H04L 63/08* (2013.01); *H04L 63/0807* (2013.01); *H04W 12/001* (2019.01); *H04B 7/04* (2013.01);
(Continued)

(58) Field of Classification Search
CPC ... H04L 63/029; H04L 63/08; H04L 63/0807; H04L 63/0428; H04L 63/0471; H04L 63/0464; H04L 63/0272; H04L 2209/80; H04L 9/3226; H04W 12/001; H04W 12/04

See application file for complete search history.

(56) References Cited

U.S. PATENT DOCUMENTS 6,877,095 B1 4/2005 Allen
7,085,850 B2 8/2006 Calvignac et al.
(Continued)

OTHER PUBLICATIONS

Cordell, Ruffin; *Seven Networks, LLC* Plaintiff, v. *Apple Inc.* Defendant; Civil Action No. 2:19-cv-115-JRG; Apple's Reply in Support of Its Motion to Strike Portions of Dr. Jones's Expert Reports Regarding Undisclosed Infringement Theories and Validity Contentions as to the U.S. Pat. Nos. 9,608,968, 9,712,476, and 10,135,771 Patents [D179]; Aug. 25, 2020; pp. 1-9.
(Continued)

*Primary Examiner* — Matthew Smithers
(74) *Attorney, Agent, or Firm* — NK Patent Law

(57) ABSTRACT

A communication network encrypts a first portion of a transaction associated with point-to-point communications using a point-to-point encryption key. A second portion of the transaction associated with end-to-end communications is encrypted using an end-to-end encryption key.

21 Claims, 7 Drawing Sheets

Related U.S. Application Data continuation of application No. 15/931,060, filed on May 13, 2020, now Pat. No. 10,804,976, which is a continuation of application No. 16/176,946, filed on Oct. 31, 2018, now Pat. No. 10,693,531, which is a continuation of application No. 15/639,014, filed on Jun. 30, 2017, now Pat. No. 10,135,771, which is a continuation of application No. 15/140,284, filed on Apr. 27, 2016, now Pat. No. 9,712,476, which is a continuation of application No. 14/043,772, filed on Oct. 1, 2013, now Pat. No. 9,344,393, which is a continuation of application No. 13/396,464, filed on Feb. 14, 2012, now Pat. No. 8,549,587, which is a continuation of application No. 12/889,252, filed on Sep. 23, 2010, now Pat. No. 8,127,342, which is a continuation of application No. 11/875,785, filed on Oct. 19, 2007, now Pat. No. 7,827,597, which is a continuation of application No. 10/339,369, filed on Jan. 8, 2003, now Pat. No. 7,305,700.

(60) Provisional application No. 60/403,249, filed on Aug. 12, 2002, provisional application No. 60/346,881, filed on Jan. 8, 2002.

(51) Int. Cl.
| | |
|---|---|
| *H04L 9/32* | (2006.01) |
| *H04L 12/58* | (2006.01) |
| *H04W 4/12* | (2009.01) |
| *H04W 88/06* | (2009.01) |
| *H04L 29/08* | (2006.01) |
| *H04B 7/04* | (2017.01) |
| *H04B 7/06* | (2006.01) |
| *H04B 7/0417* | (2017.01) |
| *H04W 76/10* | (2018.01) |
| *H04W 12/04* | (2021.01) |
| *H04W 52/02* | (2009.01) |

(52) U.S. Cl.
CPC .......... *H04B 7/0417* (2013.01); *H04B 7/0617* (2013.01); *H04L 51/38* (2013.01); *H04L 63/0281* (2013.01); *H04L 67/04* (2013.01); *H04L 67/1095* (2013.01); *H04L 67/14* (2013.01); *H04L 69/329* (2013.01); *H04W 4/12* (2013.01); *H04W 12/04* (2013.01); *H04W 52/0261* (2013.01); *H04W 76/10* (2018.02); *H04W 88/06* (2013.01); *Y02D 10/00* (2018.01); *Y02D 30/70* (2020.08)

(56) References Cited

U.S. PATENT DOCUMENTS

| | | | | |
|---|---|---|---|---|
| 7,305,700 | B2 | 12/2007 | Boynton et al. | |
| 7,814,208 | B2 | 10/2010 | Stephenson et al. | |
| 8,725,880 | B2 * | 5/2014 | Santamaria | H04L 65/1006 709/227 |
| 9,712,476 | B2 | 7/2017 | Boynton et al. | |
| 10,135,771 | B2 | 11/2018 | Boynton et al. | |
| 2002/0035681 | A1 | 3/2002 | Maturana et al. | |
| 2002/0042883 | A1 | 4/2002 | Roux et al. | |
| 2002/0095588 | A1 | 7/2002 | Shigematsu et al. | |
| 2012/0092438 | A1 * | 4/2012 | Guzman Suarez | H04N 7/15 348/14.03 |

OTHER PUBLICATIONS

Dang, Thu A., et al.; *Apple, Inc.*, Petitioner, v. *Seven Networks, LLC*, Patent Owner; IPR2020-00707; U.S. Pat. No. 9,712,476 B2, ; Decision, Institution of Inter Partes Review, 35 U.S.C. § 314; Oct. 22, 2020; pp. 1-32.
Cordell, Ruffin; *Seven Networks, LLC* Plaintiff, v. *Apple Inc.* Defendant; Civil Action No. 2:19-cv-115-JRG; Apple Inc's Reply in Support of Its Motion for Summary Judgment of Ineligibility Under 35 U.S.C. § 101 [DKT.171]; Aug. 18, 2020; pp. 1-9.
Renner, Karl; Petition for Inter Partes Review of U.S. Pat. No. 10,135,771; AIA Review No. IPR2020-00266; Filed Dec. 23, 2019; pp. 1-77.
Exhibits 1002—Petition for Inter Partes Review of U.S. Pat. No. 10,135,771; AIA Review No. IPR2020-00266; Excerpts From the Prosecution History of the 771 Patent; Filed Dec. 23, 2019; pp. 1-402.
Exhibits 1003—Petition for Inter Partes Review of U.S. Pat. No. 10,135,771; AIA Review No. IPR2020-00266; Declaration of Darrell Long; Dec. 20, 2019; pp. 1-143.
Renner, Karl; Petition for Inter Partes Review of U.S. Pat. No. 9,712,476 ; AIA Review No. IPR2020-00279; Filed Dec. 24, 2019; pp. 1-79.
Exhibits 1002—Petition for Inter Partes Review of U.S. Pat. No. 9,712,476 ; AIA Review No. IPR2020-00279; Excerpts From the Prosecution History of the '476 Patent; Filed Dec. 24, 2019; pp. 1-283.
Exhibits 1003—Petition for Inter Partes Review of U.S. Pat. No. 9,712,476 ; AIA Review No. IPR2020-00279; Declaration of Darrell Long; Dec. 23, 2019; pp. 1-154.
Renner, Karl; Petition for Inter Partes Review of U.S. Pat. No. 9,712,476; AIA Review No. IPR2020-00707; Filed Apr. 10, 2020; pp. 1-80.
Exhibits 1002—Petition for Inter Partes Review of U.S. Pat. No. 9,712,476; AIA Review No. IPR2020-00707; Excerpts From the Prosecution History of the '476 Patent; Filed Apr. 10, 2020; pp. 1-283.
Exhibits 1003—Petition for Inter Partes Review of U.S. Pat. No. 9,712,476; AIA Review No. IPR2020-00707; Declaration of Darrell Long; Filed Apr. 10, 2020; pp. 1-117.
Exhibits 1008—Petition for Inter Partes Review of U.S. Pat. No. 9,712,476; AIA Review No. IPR2020-00707; U.S. Appl. No. 60/403,249; History Filed Apr. 10, 2020; pp. 1-355.
Exhibits 1009—Petition for Inter Partes Review of U.S. Pat. No. 9,712,476; AIA Review No. IPR2020-00707; U.S. Appl. No. 60/346,881; History Filed Apr. 10, 2020; pp. 1-1462.
Exhibits 1011—Petition for Inter Partes Review of U.S. Pat. No. 9,712,476; AIA Review No. IPR2020-00707; Apple Inc.'s P.R. 3-3 and 3-4 Invalidity Contentions; Filed Aug. 26, 2019; pp. 1-297.
Exhibits 1012—Petition for Inter Partes Review of U.S. Pat. No. 9,712,476; AIA Review No. IPR2020-00707; Apple Inc.'s P.R. 3-3 and 3-4 First Supplemental Invalidity Contentions; Filed Nov. 25, 2019; pp. 1-301.
European Patent Office; Decision to Grant EP Application No. 19168737.5; dated May 4, 2020; pp. 1-2.
Graubart, Noah; Defendant Apple Inc.'s First Amended Answer, Affirmative Defenses, and Counterclaims to Plaintiff's Complaint (Redacted), EDTX Case No. 2:19-cv-115-JRG; *Seven Networks, LLC* v. *Apple Inc.*; Filed Jan. 3, 2020; pp. 1-164.
Gilstrap Rodney; The US District Court for the Eastern District of TX, Marshall Division; Case No. 2:19-CV-115-JRG; *Seven Networks, LLC* v. *Apple Inc.*; Claim Construction Memorandum and Order; Filed Mar. 31, 2020; pp. 1-102.
Dang, Thu A.; *Apple, Inc.*, Petitioner, v. *Seven Networks, LLC*, Patent Owner; IPR2020-00266; U.S. Pat. No. 10,135,771 B2; Decision, Granting Institution of Inter Partes Review, 35 U.S.C. § 314; Aug. 14, 2020; pp. 1-47.
Dang, Thu A.; *Apple, Inc.*, Petitioner, v. *Seven Networks, LLC*, Patent Owner; IPR2020-00279; U.S. Pat. No. 9,712,476 B2; Decision, Granting Institution of Inter Partes Review, 35 U.S.C. § 314; Aug. 14, 2020; pp. 1-42.

* cited by examiner

SOURCE

# SECURE END-TO-END TRANSPORT THROUGH INTERMEDIARY NODES

CROSS-REFERENCE TO RELATED APPLICATION(S)

This application is a continuation of U.S. patent application Ser. No. 16/902,325 filed Jun. 16, 2020, entitled "SECURE END-TO-END TRANSPORT THROUGH INTERMEDIARY NODES", which is a continuation of U.S. patent application Ser. No. 15/931,060 filed May 13, 2020, entitled "SECURE END-TO-END TRANSPORT THROUGH INTERMEDIARY NODES", which is a continuation of U.S. patent application Ser. No. 16/176,946 filed Oct. 31, 2018, entitled "SECURE END-TO-END TRANSPORT THROUGH INTERMEDIARY NODES", now U.S. Pat. No. 10,693,531 which issued Jun. 23, 2020, which is a continuation of U.S. patent application Ser. No. 15/639,014 filed Jun. 30, 2017, entitled "SECURE END-TO-END TRANSPORT THROUGH INTERMEDIARY NODES", now U.S. Pat. No. 10,135,771 which issued Nov. 20, 2018, which is a continuation of U.S. patent application Ser. No. 15/140,284 filed Apr. 27, 2016, entitled "SECURE END-TO-END TRANSPORT THROUGH INTERMEDIARY NODES", now U.S. Pat. No. 9,712,476 which issued Jul. 18, 2017, which is a continuation of U.S. patent application Ser. No. 14/043,772 filed Oct. 1, 2013, entitled "SECURE END-TO-END TRANSPORT THROUGH INTERMEDIARY NODES", now U.S. Pat. No. 9,344,393 which issued May 17, 2016, which is a continuation of U.S. patent application Ser. No. 13/396,464 filed Feb. 14, 2012, entitled "SECURE END-TO-END TRANSPORT THROUGH INTERMEDIARY NODES", now U.S. Pat. No. 8,549,587 which issued Oct. 1, 2013, which is a continuation of U.S. patent application Ser. No. 12/889,252, filed Sep. 23, 2010, entitled "SECURE END-TO-END TRANSPORT THROUGH INTERMEDIARY NODES", now U.S. Pat. No. 8,127,342 which issued Feb. 28, 2012, which is a continuation of U.S. patent application Ser. No. 11/875,785 filed Oct. 19, 2007, titled "SECURE TRANSPORT FOR MOBILE COMMUNICATION NETWORK", now U.S. Pat. No. 7,827,597 which issued Nov. 2, 2010, which is a continuation of U.S. patent application Ser. No. 10/339,369 filed Jan. 8, 2003, titled "SECURE TRANSPORT FOR MOBILE COMMUNICATION NETWORK", now U.S. Pat. No. 7,305,700 which issued Dec. 4, 2007, which claims benefit of U.S. Provisional Application No. 60/346,881 filed Jan. 8, 2002, titled "MOBILE DATA SERVICES" and claims benefit of U.S. Provisional Application No. 60/403,249 filed Aug. 12, 2002, titled "MOBILE DATA SERVICES". The disclosure of each of the aforementioned applications is incorporated herein by reference in their entireties.

BACKGROUND

Security is a concern when information is transferred over the Internet. Encryption technology may be used to protect data transferred between two nodes communicating across a network such as the Internet. The Internet infrastructure involved in transferring a particular set of data may include one or more intermediary network processing nodes that need to process different portions of the data in order to correctly route the packets between the two endpoints.

The intermediary network processing nodes may be given access to the encryption key used to encrypt the data. However, decrypting the packets at the intermediary points presents a security risk. For example, an eavesdropper may be able to access the data after being decrypted at the intermediary network processing nodes.

The present invention addresses this and other problems associated with the prior art.

SUMMARY

A communication node encrypts a first portion of a transaction associated with point-to-point communications using a point-to-point encryption key corresponding to a first security association. A second portion of the transaction associated with end-to-end communications is encrypted using an end-to-end encryption key corresponding to a second security association.

The foregoing and other objects, features and advantages of the invention will become more readily apparent from the following detailed description of a preferred embodiment of the invention which proceeds with reference to the accompanying drawings.

DETAILED DESCRIPTION

The transfer of different types of data may be referred to below generally as a transaction. These transactions can be used for transferring email data, calendars, contacts, tasks, notes, electronic documents, files or any other type of control or content data.

Figure 1:
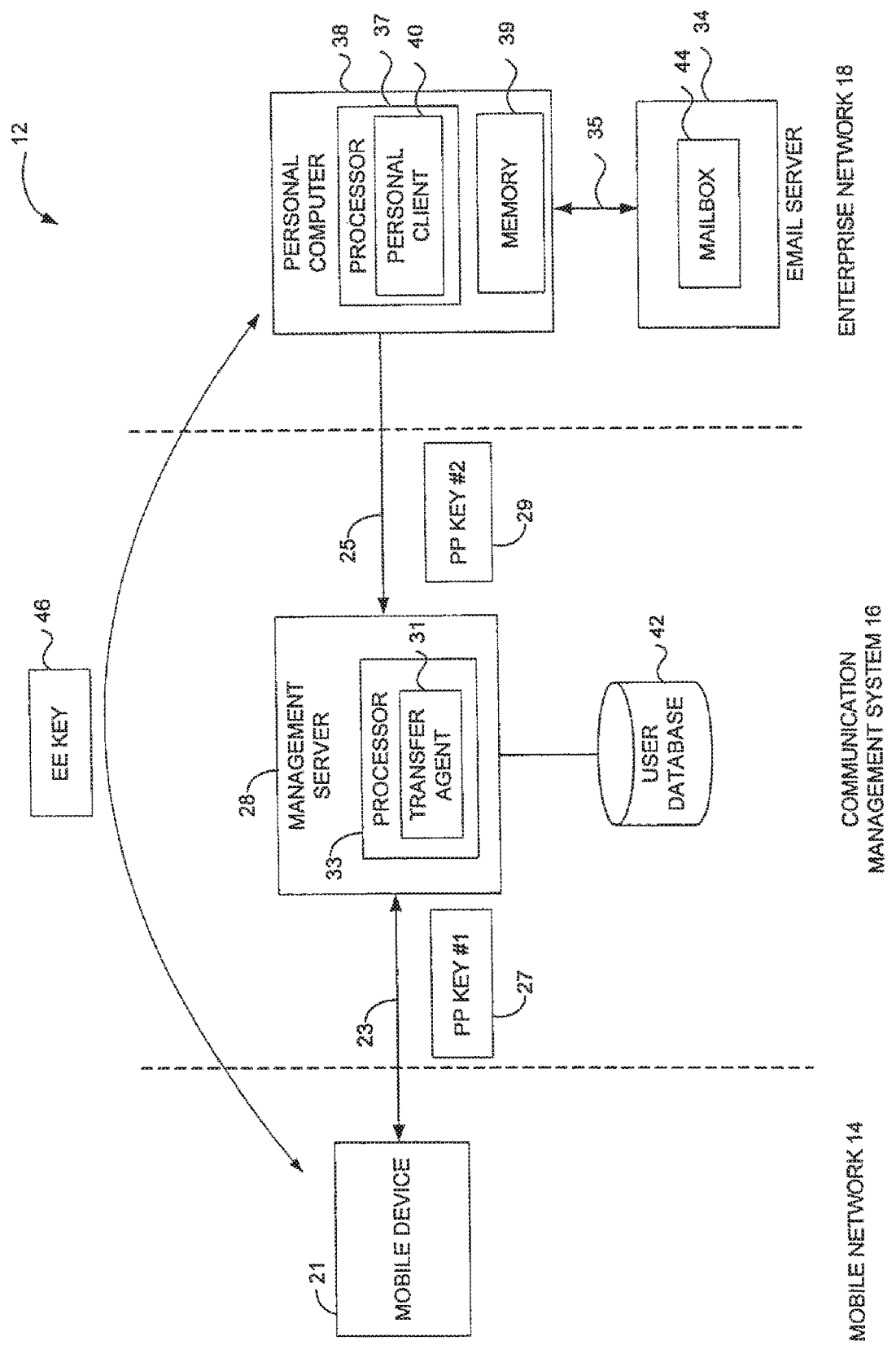
FIG. 1 is a block diagram showing how encryption keys are exchanged in a communication network.

FIG. 1 shows one embodiment of a communication network 12 that includes a mobile network 14, an enterprise network 18, and a communication management system 16 that manages communications between the mobile network 14 and the enterprise network 14. The mobile network 14 includes mobile devices 21 that communicate with an IP infrastructure through a wireless or landline service provider. Since mobile networks 14 are well known, they are not described in further detail.

The enterprise network 18 can be any business network, individual user network, or local computer system that maintains local email or other data for one or more users. In the embodiment shown in FIG. 1, the enterprise network 18 includes an email server 34 that contains a user mailbox 44 accessible using a Personal Computer (PC) 38. In one example, the email server 34 may be a Microsoft® Exchange® server and the PC 38 may access the mailbox 44 through a Microsoft® Outlook® software application. The mailbox 44 may contain emails, contact lists, calendars, tasks, notes, or any other type of data or electronic document.

The PC 38 is connected to the email server 34 over a Local Area Network (LAN) 35. The PC 38 includes memory 39 for storing local files that may include personal email data as well as any other types of electronic documents. Personal client software 40 is executed by a processor 37 in the PC 38. The personal client 40 enables access to email, calendars, and contact information as well as local files for mobile device 21.

The communication management system 16 includes at least one management server 28 that includes a processor 33. The processor operates a transfer agent 31 that manages the transactions between the mobile device 21 and the enterprise network 18. A user database 42 includes configuration information for different users of a mobile communication server. For example, the user database 42 may include login data for user of the mobile communication server. While referred to as a management system 16 and management server 28, this can be any intermediary system that includes one or more intermediary servers that operate between the mobile network 14 and the enterprise or private network 18.

The personal client 40 makes an outbound connection 25 to the management server 28. The personal client 40 registers the presence of a particular user to the management server 28 and negotiates a security association specifying a cryptographic ciphersuite (including encryption cipher, key length, and digital signature algorithm) and a unique, secret point-to-point encryption key 29 over connection 25. In one example, the key 29 is an Advanced Encryption Standard (AES) key, which is negotiated using the Diffie-Hellman cryptographic algorithm. Of course, encryption ciphers other than AES can also be used. The encryption key 29 enables secure communication between management server 28 and PC 38 over connection 25.

The mobile device 21 negotiates a point-to-point security association, specifying a cryptographic ciphersuite and a unique encryption key 27, with the management server 28. In one example, the point-to-point encryption key 27 is an AES encryption key. The negotiated security association that includes encryption key 27 enables secure point-to-point communication between the mobile device 21 and the management server 28 over connection 23. Each different mobile device 21 must negotiate a different security association that includes a unique encryption key 27 with the management server 28.

The point-to-point encryption key 27 may be used for encrypting control data that needs to be transferred between the mobile device 21 and management server 28. The point-to-point encryption key 29 may be used for encrypting control data that needs to be transferred between the management server 28 and personal client 40. For example, the control data may include login information and transaction routing information.

An end-to-end security association, specifying a cryptographic ciphersuite and a unique encryption key 46, is negotiated between the mobile device 21 and the personal client 40. In one example, the end-to-end encryption key 46 is an AES encryption key. The end-to-end encryption key 46 is used for encrypting transaction payloads transferred between personal client 40 and mobile device 21. For example, the end-to-end encryption key 46 may be used for encrypting the content of emails, files, file path names, contacts, notes, calendars, electronic documents and any other type of data that needs to be securely transferred between mobile device and the PC. The end-to-end encryption key 46 is only known by the mobile device 21 and the personal client 40. Data encrypted using the end-to-end key 46 cannot be decrypted by the management server 28.

Figure 2:
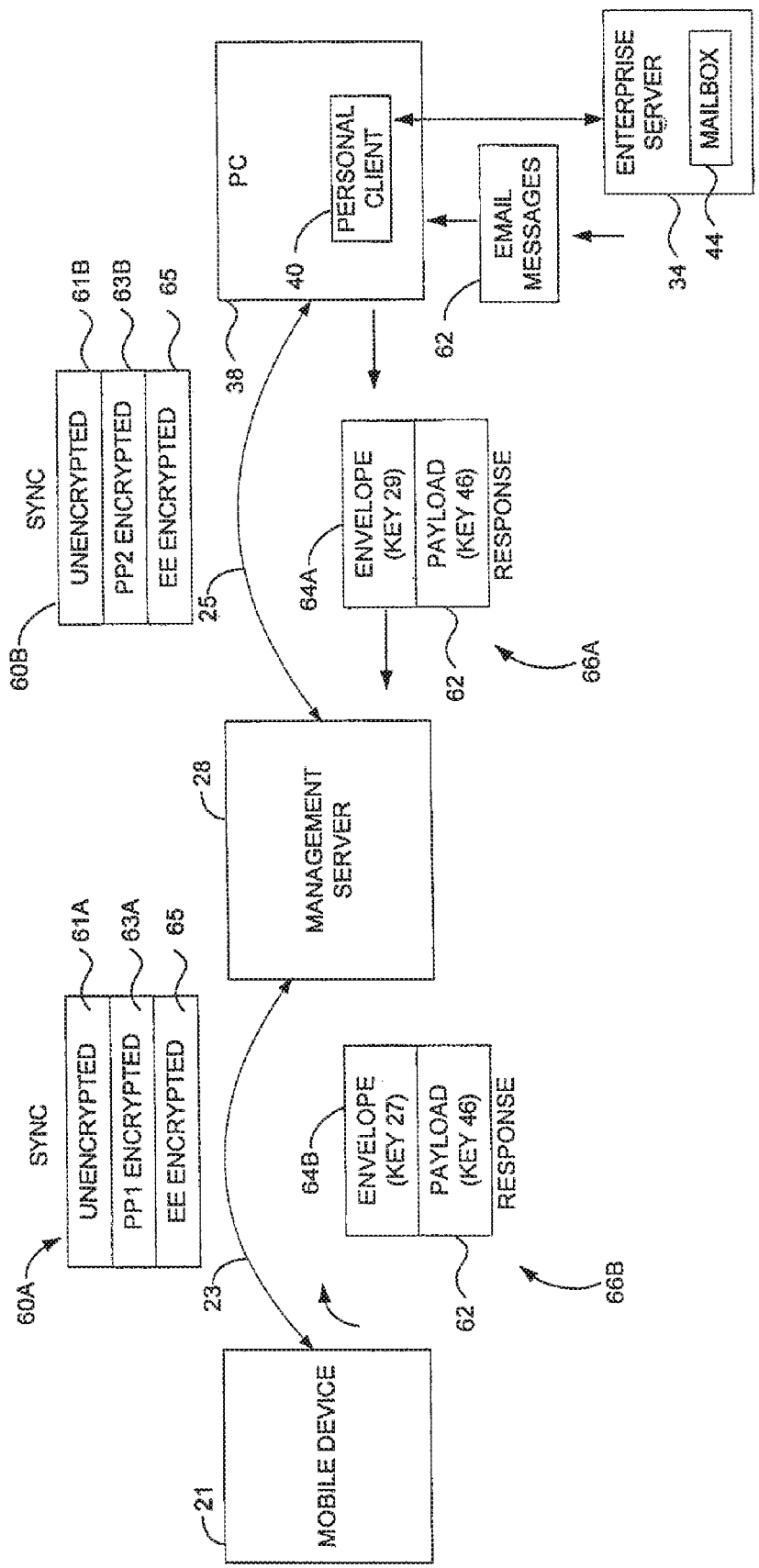
FIG. 2 is a block diagram showing how data is encrypted according to the encryption keys.

FIG. 2 shows an example of a synchronization transaction 60A sent by the mobile device 21 requesting retrieval of the latest email messages in mailbox 44. One portion 63A of the synchronization transaction 60A is encrypted by the mobile device 21 using the point-to-point encryption key 27 (FIG. 1). Another portion 65 of synchronization transaction 60A is encrypted using the end-to-end encryption key 46. Another third portion 61A of the synchronization transaction 60 may not be encrypted at all. The mobile device 21 sends the synchronization transaction 60A to the management server 28 over connection 23.

The management server 28 decrypts the portion 63A of the transaction 60 encrypted using the point-to-point encryption key 27. Since server 28 does not have encryption key 46, portion 65 is not decrypted. The management server 28 decodes any unencrypted data 61A and the decrypted point-to-point data 63A to determine how to process the synchronization transaction 60A. Part of the processing may include re-encrypting some or all of the decrypted data 63A back into point-to-point encrypted data 63B using encryption key 29. The management server 28 may also modify or add to the unencrypted data 61A to generate new unencrypted data 61B. The unencrypted data 61B and the re-encrypted point-to-point data 63B are combined with the end-to-end encrypted data 65 to generate new synchronization transaction 60B. The transaction 60B is transported to personal client 40 over the connection 25.

The personal client 40 decrypts the point-to-point encrypted data 63B using the encryption key 29 and decrypts the end-to-end encrypted data 65 using the encryption key 46. The personal client 40 obtains email messages 62 from the mailbox 44 pursuant to the decrypted instructions in synchronization transaction 60B. The personal client 40 encrypts the content of the email messages 62 using the end-to-end encryption key 46.

The personal client 40 generates a response transaction 66A that may attach an envelope 64A to the end-to-end encrypted email messages 62. The envelope 64A may contain communication parameters identifying transaction 66A as a response to the synchronization transaction 60B and may contain other message parameters such as the size of the email messages 62.

Some or all of the envelope 64A may be encrypted using the point-to-point encryption key 29. The personal client 40 then sends message 66A to the management server 28. The management server 28 decrypts the envelope 64A using the point-to-point encryption key 29 and processes the decrypted data necessary for forwarding the response transaction 66A to the mobile device 21. The payload 62 in the response transaction 66A is not decrypted since the management server 28 does not have access to end-to-end key 46.

The management server 28 re-encrypts some or all of the information in envelope 64A into envelope 64B. The envelope 64B is re-encrypted using the point-to-point key 27. A response message 66B is generated that includes the envelope 64B and end-to-end encrypted payload 62.

The response message 66B is transported to mobile device 21 over connection 23. The mobile device 21 decrypts the envelope 64B using encryption key 27 and decrypts the payload 62 using the encryption key 46. The decrypted payload 62 is then displayed on the mobile device 21. For example, emails from the mailbox 44 are displayed on the mobile device 21.

Figure 3:
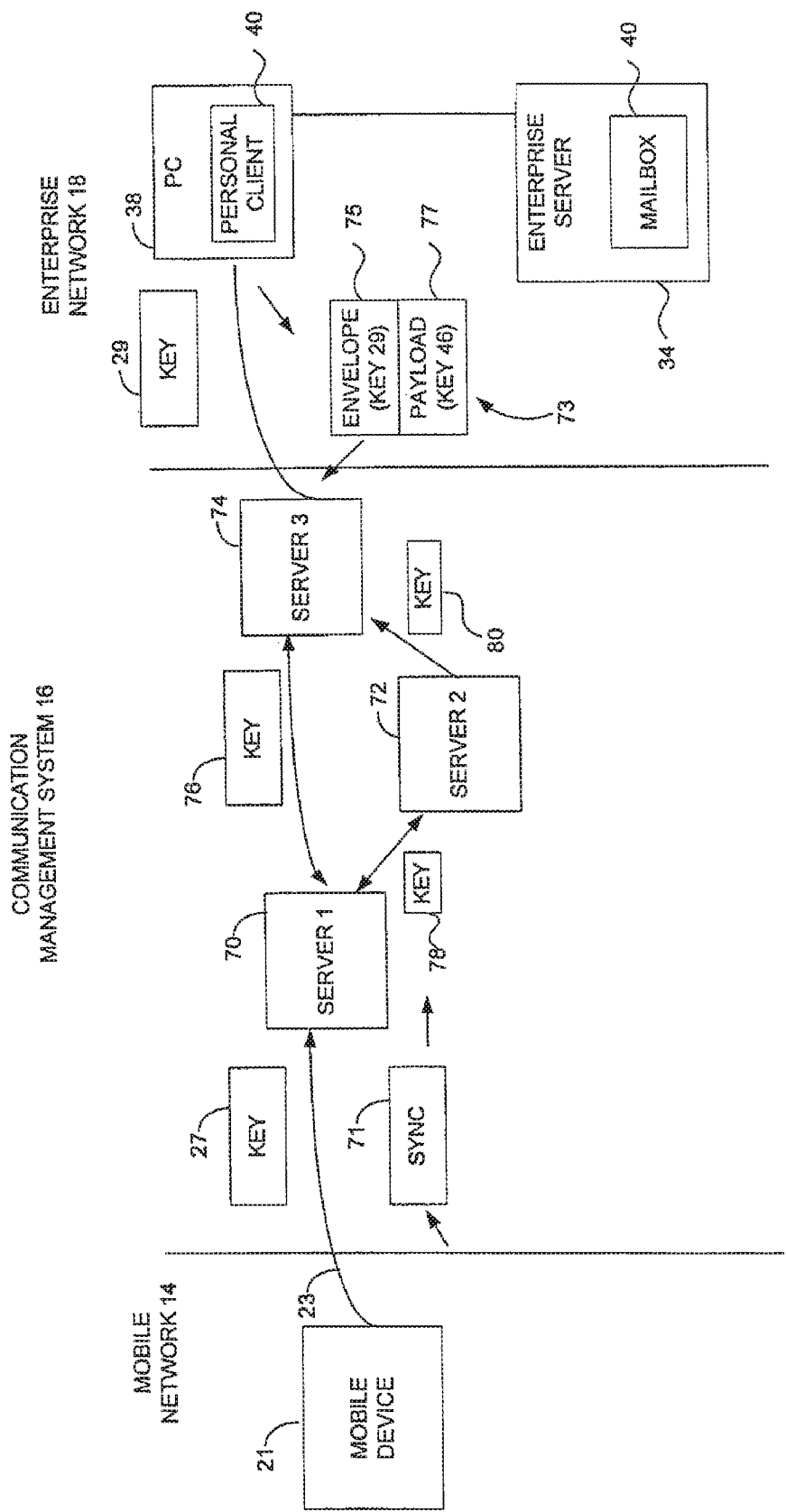
FIG. 3 is a block diagram showing how multiple encryption keys are exchanged between different servers in the communication network.

FIG. 3 shows another embodiment of the invention. The communication management system 16 may include multiple servers 70, 72 and 74 that each perform different communication management tasks. Transactions 71 and 73 sent between mobile device 21 and PC 38 may need to be processed by different combinations of servers 70, 72 and 74.

Encryption key 76 is negotiated between server 70 and server 74, encryption key 78 is negotiated between server 70 and server 72, and encryption key 80 is negotiated between server 72 and server 74. The negotiated encryption keys 76, 78 and 80 are used when processing the transactions 71 and 73.

For example, the transaction 73 may be sent from personal client 40 to server 74. The personal client 40 encrypts some or all of the envelope 75 in transaction 73 using the encryption key 29 and encrypts a payload 77 using encryption key 46. After receiving transaction 73, server 74 decrypts envelope 75 using encryption key 29.

Server 74 may then need to send the transaction 73 to server 70. Server 74 re-encrypts the decrypted envelope 75 using encryption key 76. Upon receiving message 73, server 70 decrypts envelope 75 using encryption key 76. After processing the contents, the server 70 re-encrypts the envelope 75 using the encryption key 27 previously negotiated with mobile device 21. The transaction 73 is then sent from server 70 to mobile device 21. Similar to FIG. 2, the servers 70, 72 and 74 never have access to the encrypted payload 77 in transaction 73.

A synchronization transaction 71 on the other hand may need to be processed by all three servers 70, 72 and 74. A portion of the synchronization transaction 71 is encrypted using encryption key 27 when transported from mobile device 21 to server 70. Encryption key 78 is used for encrypting a portion of transaction 71 when transported from server 70 to server 72. Encryption key 80 is used to encrypt a portion of synchronization transaction 71 when transported from server 72 to server 74. Encryption key 29 is then used when the transaction 71 is transported from server 74 to PC 38.

Algorithms exist that allow secure negotiation of encryption keys between two nodes that are communicating directly with each other or that are communicating through intermediary nodes. One example of an encryption algorithm that allows secure key negotiation regardless of network topology is Elliptic Curve Cryptography Diffie-Hellman (ECC-DH).

Figure 4:
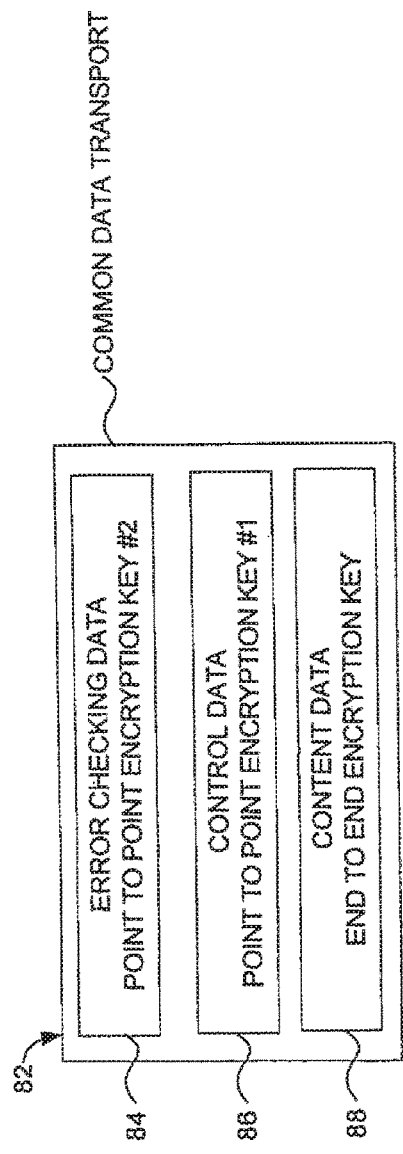
FIG. 4 is a diagram showing how different types of data are encrypted using different encryption keys.

FIG. 4 shows how encryption is performed differently for different types of data or for data associated with different destinations. Transaction 82 includes content data 88 such as the contents of an email message, an electronic document, or any other type of information that should only be accessed by two endpoints. The content data 88 is encrypted using an end-to-end encryption key.

A second portion 86 of transaction message 82 may include control information that only needs to be processed by one particular server. In this case, control data 86 is encrypted using a first point-to-point encryption key. A third portion of data 84 in transaction 82 may have other control information, for example, error checking data, that needs to be processed by a different server. Accordingly, the error checking data 84 is encrypted using a second point-to-point encryption key different than either of the other two encryption keys used for encrypting data 88 and 86.

Figure 5:
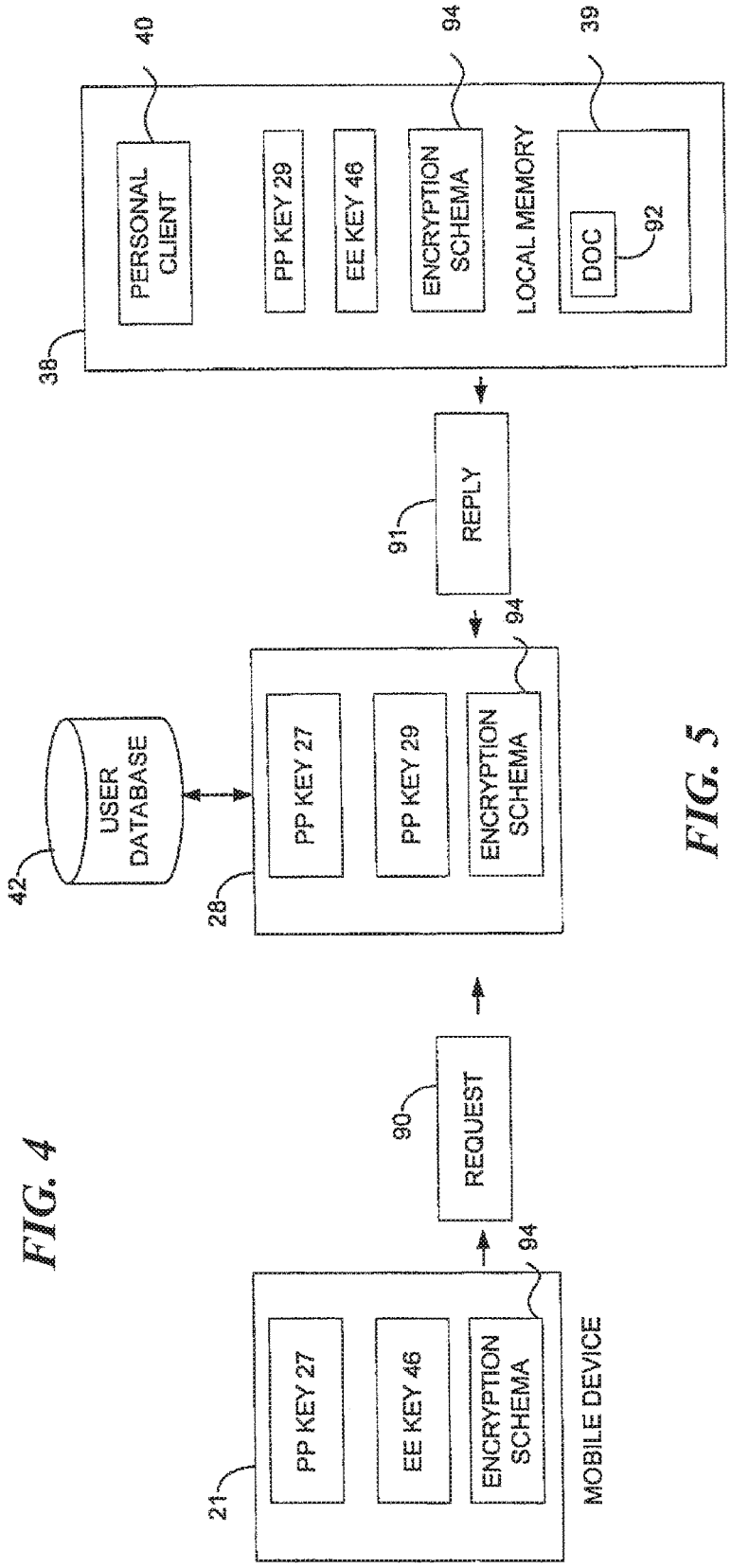
FIG. 5 is a diagram showing an encryption schema used for encrypting transactions.

FIG. 5 explains in more detail how an encryption scheme is used by the mobile device 21, management server 28, and personal client 40 when processing transactions between a source and a target device. In the example below, the mobile device 21 is operating as a source for sending a transaction 90. The transaction 90 requests personal client 40 to send a document 92 located in a personal directory in local memory 39 of PC 38. The personal client 40 operates as a target for the transaction 90 and the management server 28 operates as the transfer agent for transferring the transaction 90 from the mobile device 21 to the personal client 40.

It should be understood that this is only an example, and the devices shown in FIG. 5 can process many different types of transactions. For example, the transaction 90 may request synchronization of emails in the PC 38 with emails in the mobile device 21. Further, any device can operate as a source or target for the transaction. For example, the personal client 40 operates as a source and the mobile device 21 operates as a target when a transaction 91 is sent as a reply to request 90.

The mobile device 21, management server 28, and the personal client 40 are all configured with an encryption schema 94 that identifies how specific items in the transaction 90 are to be encrypted. Each device is also configured with different security associations as described above in FIGS. 1-3. For example, the mobile device 21 has both Point-to-Point (PP) key 27 and End-to-End (EE) key 46. Management server 28 has PP key 27 and PP key 29, and the PC 38 has PP key 29 and EE key 46.

Figure 6:
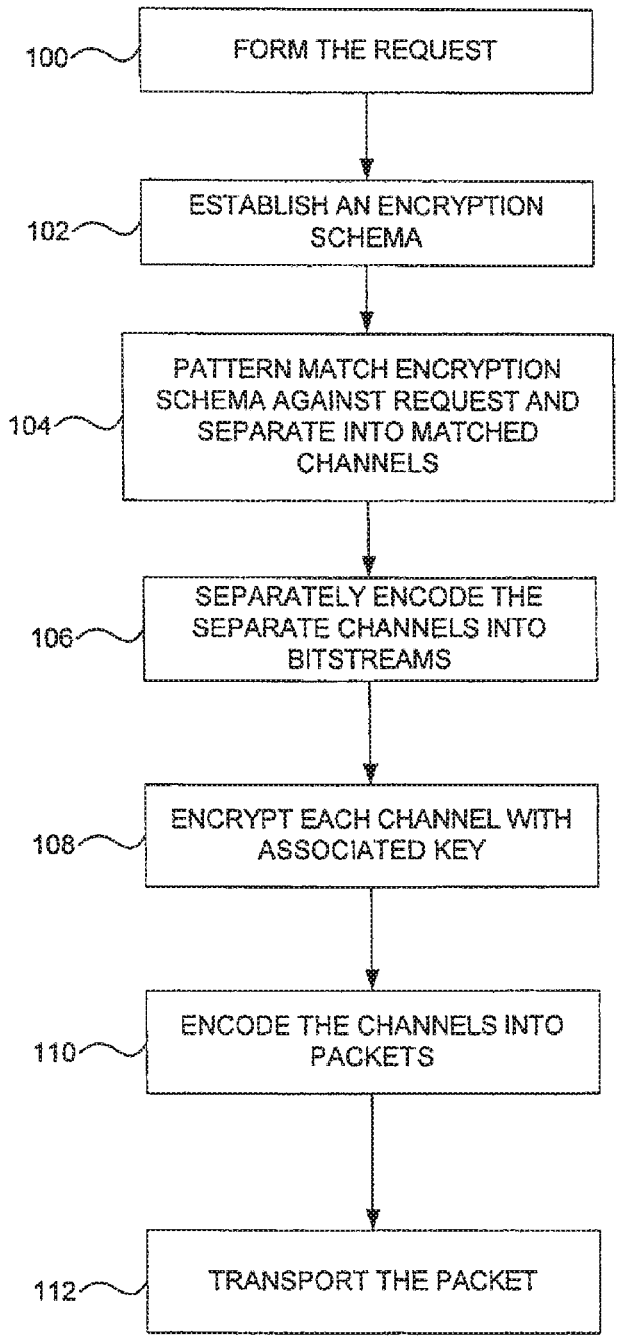
FIGS. 6-8 are block diagrams showing how different devices in the communication network use the encryption schema to encrypt and decrypt transactions.

Referring to FIGS. 5 and 6, the mobile device 21 in block 100 forms the request transaction 90. One example of a request is as follows.

| Request: | {auth_token = "abc", device_id = "xyz", method_id = "GetDocument", args = {path = "/docs"} } |
|---|---|

Mobile device 21 attaches an auth_token to transactions sent to the management server 28. For example, the mobile device 21 may be required to authenticate to the management server 28 by transmitting a username and password prior to being permitted to submit other transactions for processing. The server 28 issues the mobile device 21 an auth_token after successfully validating the username and password against information in the user database 42. The mobile device 21 then attaches the auth_token to subsequent transactions sent to the management server 28. The management server 28 uses the auth_token to identify and authenticate the source of each transaction and to determine where to route the transaction.

The device_id identifies the particular mobile device 21 sending the request 90. The device_id may be necessary for example when a user has more than one mobile device. The personal client 40 can use different device_id values to track when synchronization information was last sent to each of multiple different mobile devices. The device_id can also be used by either the management server 28 or the personal client 40 to determine how to format data sent to particular types of mobile devices 21. For example, data may need to be formatted differently for a cell phone as opposed to a personal computer. The device_id can also be used to correlate a known security association with a particular mobile device.

The method_id item in the example identifies a particular function GetDocument associated with request 90. The method_id item also requires the inclusion of related argument items that identify the parameters for the GetDocument function. For example, the argument items might include the expression path="/docs" identifying the pathname where the requested documents are located.

Block 102 in FIG. 6 establishes the encryption schema 94 previously shown in FIG. 5. One example of an encryption schema 94 is shown below illustrating how the example GetDocument request shown above would be handled in the specific case of communication between the mobile device 21 and the management server 28.

```
Encryption schema:    {GetDocument =
                        {clear = ["device id"],
                         pp = ["auth_token", "user_id"],
                         ee = ["args.path"]
                        }
                        default = { pp }
                       }
```

Any items that do not require encryption are assigned to the data channel labeled "clear". For example, the device_id item in the example is assigned to the channel "clear". Items requiring the use of point-to-point encryption are assigned to data channel "pp" and therefore are encrypted using the PP key 27 as shown in FIG. 5. In this example the auth_token is assigned to the "pp" channel and encrypted using the PP key 27. Items requiring end-to-end encryption are assigned to the "ee" channel and encrypted using the EE key 46 shown in FIG. 5. In this example the "args.path" item is assigned to the "ee" channel and encrypted using the EE key 46.

In this example, any item that is not explicitly declared in the encryption schema 94 is assigned by default to the "pp" channel. Since the method id item has not been specifically declared in the encryption schema 94, it is assigned to the "pp" channel by default and encrypted using the PP key 27.

It is important to note that the context of the communication determines the specific security association selected for encryption of a channel. For example, the first "pp" channel between mobile device 21 and management server 28 uses a security association different from the one established for the second, independently established "pp" channel between management server 28 and personal client 40. In this example, the first "pp" channel would employ the PP key 27 in FIG. 5 for transactions between device and server, while the second "pp" channel would use the PP key 29 for transactions between server and client. Because each security association is independently negotiated, the differences between the two aforementioned "pp" channels could extend beyond each channel having a unique key to include different key lengths (i.e. 256 bit vs. 128 bit), encryption ciphers (i.e. Triple DES vs. AES), digital signature algorithm (i.e. SHA1 vs. MD5), or other security parameters.

In order to prepare the request 90 for transmission, the mobile device 21 in block 104 of FIG. 6 performs a pattern match of the request 90 using the encryption schema 94. This pattern match separates the items in request 90 into different channels. One example of the different channels is shown below. In this example, the items in each channel are associated with predefined security associations: clear, pp, and ee.

```
Channels:    {clear = { device_id = "xyz"}
              pp = {auth_token = "abc", method id = "GetDocument"}
              ee = {args = {path = {path = "/docs"} } }
             }
```

In block 106, the channel contents are encoded (via a process commonly known as serialization) into arrays of bits or bytes referred to as data groups. These groupings of bits or bytes are referred to generally below as arrays but can be any type of partition, group, etc.

The contents of the clear channel are encoded into an array of bits referred to as data_group_1, the contents of the pp channel are encoded into an array of bits referred to as data_group_2, and the contents of the ee channel are encoded into an array of bits referred to as data_group_3. The contents of each channel need to be encoded into bit arrays so that they can be encrypted. The contents of the channels after being encoded into bit arrays are represented as follows.

```
Encoded
Channels:    {clear = data_group_1
              pp = data_group_2
              ee = data_group_3}
```

The bit arrays are then encrypted in block 108 according, to, the security association parameters for each channel. According to the encryption schema 94, bits in the clear channel (data_group_1) are not encrypted. The bits in the pp channel data_group_2 are encrypted using the point-to-point security association between mobile device 21 and management server 28, using PP key 27, and are referred to after encryption as pp_data_group_2. The bits in the ee channel data_group_3 are encrypted using the end-toend security association between mobile device 21 and personal client 40, using EE key 46, and are referred to after encryption as ee_data_group_3. The data groups are represented as follows after encryption:

```
Encoded
Channels:    {clear = data_group_1
              pp = pp_data_group_2
              ee = ee_data_group_3}
```

The bits making up the encrypted and unencrypted channels are then encoded into one or more packets in block 110. For clarity, the description below will refer to a single packet, however, the data from the channels may be contained in multiple packets. Some of the contents of the packet are shown below.

```
              Packet
Header        length
              version
              flags
Payload       count = 3
              "clear"
              data_group_1
              "pp"
              pp_data_group_2
              "ee"
              ee_data_group_3
```

Information in the packet header may include the packet length, a version number, and other flags. The packet payload includes a count identifying 3 pairs of items. The three items include the non-encrypted contents in the clear channel, the pp encrypted contents of the pp channel, and the ee encrypted contents of the ee channel. The packet is then transported by mobile device 21 in block 112 to the management server 28.

Figure 7:
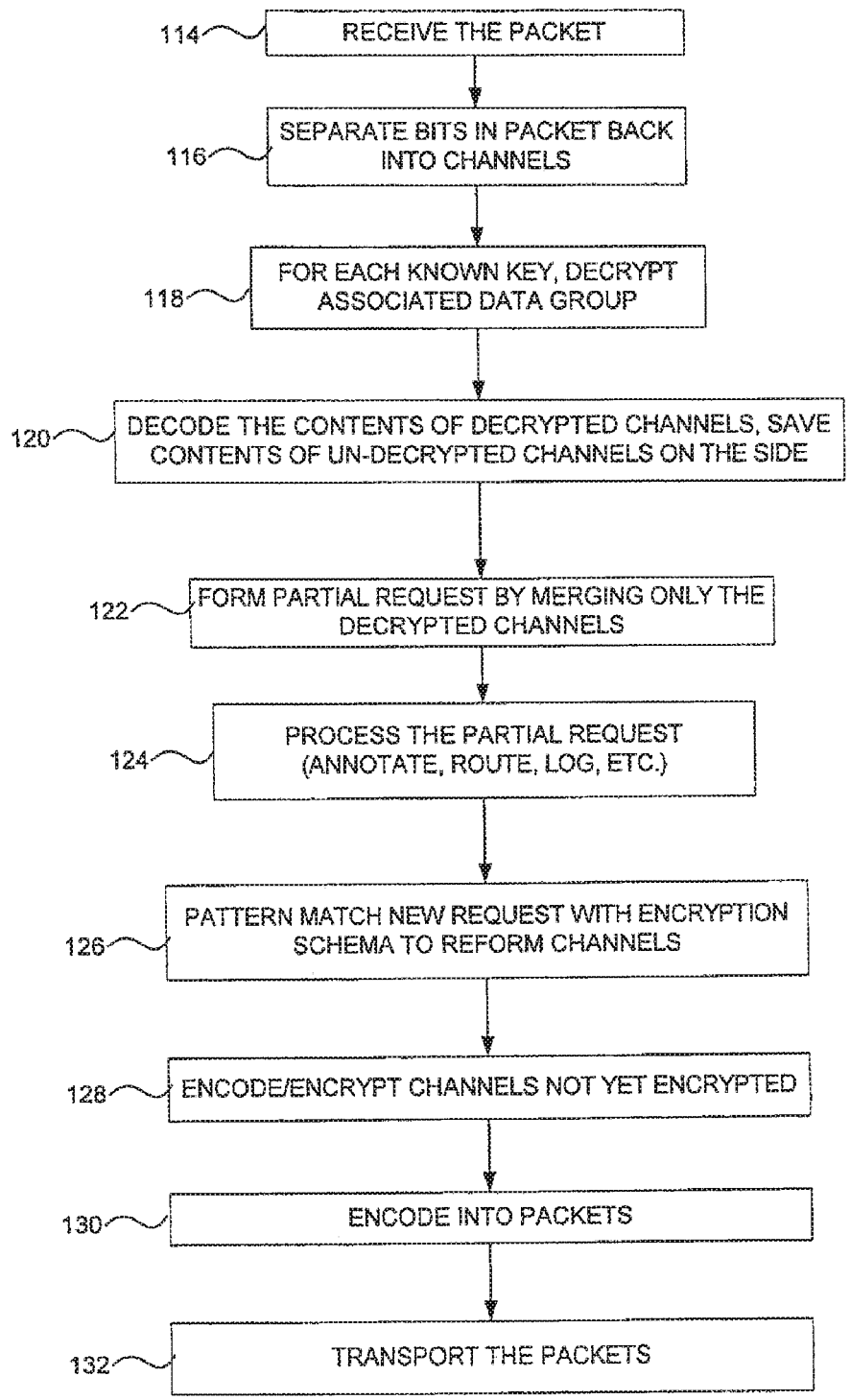

Referring to FIGS. 5 and 7, the transfer agent operating in server 28 receives the packet in block 114. The bits in the packet are separated in block 116 back into the different channels clear=data_group_1, pp=pp_data_group_2, and ee=ee_data_group_3.

The data in the clear channel does not need to be decrypted. The transfer agent in block 118 decrypts the only bits in channels for which it has a known security association. The transfer agent, as a member of the point-to-point security association between mobile device 21 and management server 28, possesses the PP key 27 and therefore decrypts the contents of the pp channel. The transfer agent is not a member of the end-to-end security association between mobile device 21 and personal client 40, does not have the EE key 46 and therefore does not decrypt the data in the ee channel. Decryption produces the following data groups: clear '=data_group_1, pp=data_group_2, and ee=ee_data_group_3.

The transfer agent in block 120 decodes the contents of the clear and pp channels. The contents of the encrypted ee channel are not decoded, but instead are maintained in an unmodified state for eventual transport to the personal client 40. Decoding produces the following contents.

| | |
|---|---|
| Decoded Channels: | {clear = {device id = "xyz"} pp = {auth token = "abc", method id = "GetDocument"} ee=ee_data_group_3 } |

In block 122 a partial request is formed by merging the items of the clear and pp channels. The partial request in this example could look similar to the following:

| | |
|---|---|
| Partial Request: | {auth_token = "abc", device_id = "xyz", method_id = "GetDocument", args = { } encrypted = {ee=ee_data_group_3} } |

The transfer agent in block 124 processes the partial request. In this example, the transfer agent may verify the request is authorized by matching the value of auth token ("abc") with contents in the user database 42 (FIG. 5). The auth_token and the method_id ("GetDocument") indicate that the transaction 90 is a document request directed to the personal client 40.

The transfer agent may identify a user id="joe" associated with the auth_token="abc" and generate the following new request.

| | |
|---|---|
| New Request: | {user_id = "joe", device_id = "xyz", method_id = "GetDocument", args = { } encrypted = {ee=ee_data_group_3} } |

In block 126 the transfer agent performs another pattern match of the new request with the encryption schema 94 to reform the channel contents associated with the different security associations. In this example, the items in the clear, pp, and ee channels are fairly similar to the items originally sent by the mobile device 21. The reformed channel contents are shown below.

| | |
|---|---|
| Channels Reformed by Transfer Agent: | {clear = device_id = "xyz"} pp = {user_id = "joe", method_id = "GetDocument"} ee = ee_data_group_3 } |

The transfer agent in block 128 encodes the contents of the clear channel into a bit array (clear=data_group_1). Since the encryption schema 28 defines no encryption for the clear channel, the bit array data_group_1 is not encrypted. The contents of the pp channel are encoded into a bit array pp=data_group_2 and then encrypted using the point-to-point security association between the management server 28 and the personal client 40, using PP key 29, forming the encrypted bit array pp=pp_data_group. The contents of the ee channel have never been decrypted or decoded by the transfer agent and therefore do not need to be re-encoded or encrypted. The following represents the bit arrays for reformed transaction.

| | |
|---|---|
| Encoded/encrypted Channels: | {clear = data_group_1 PP = PP_data_group_2 ee = ee_data_group_3} |

The transfer agent in block 130 encodes the channel contents into a packet format similar to that shown above. The packet is then transported to the personal agent 40 in block 132.

Figure 8:
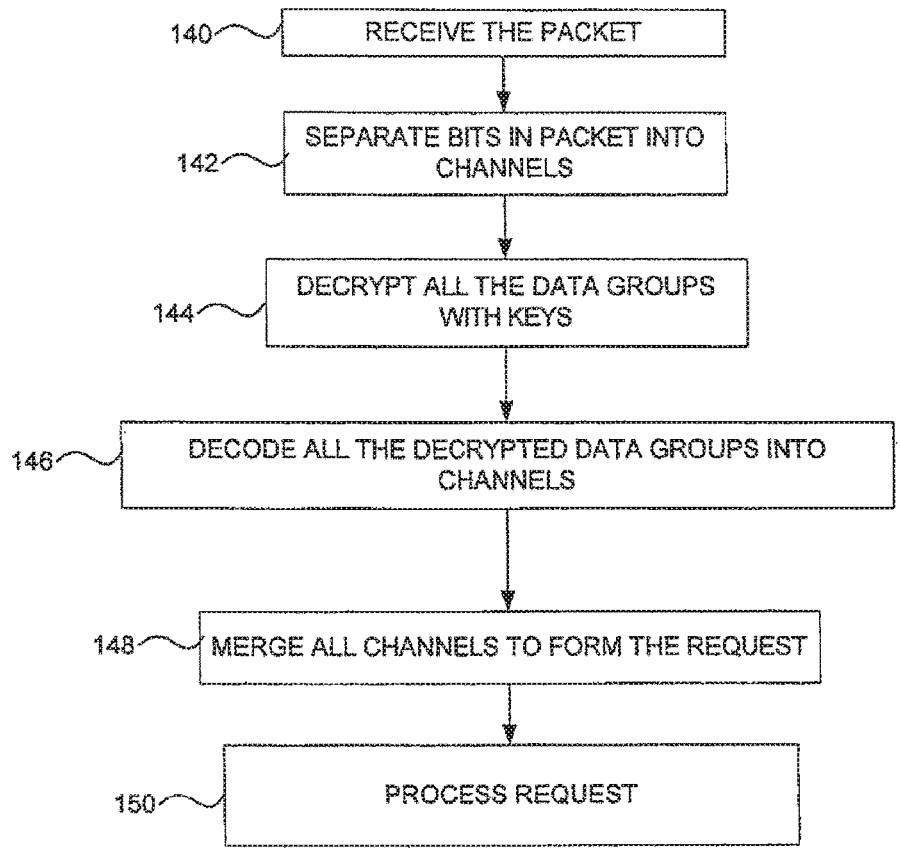

Referring to FIGS. 5 and 8, the personal client 40 is .the target of the transaction 90. The personal client 40 receives the packet in block 140 and separates the bits in the packet back into channels in block 142.

| | |
|---|---|
| Encoded/encrypted Channels: | {clear = data_group_1 pp = pp_data_group_2 ee = ee_data_group_3} |

The personal client 40 has the PP key 29, the EE key 46, and knowledge of the relevant security associations. Therefore the contents of both the pp channel and the ee channel are decrypted in block 144 generating the following decrypted bit arrays.

| | |
|---|---|
| Decrypted Channels: | {clear = data_group_1 pp = data_group_2 ee = data_group_3} |

The contents of the channels are then decoded in block 146 generating the following request items.

| | |
|---|---|
| Decoded Channels: | {clear = { device_id = "xyz"} pp = {user_id = "joe", method_id = "GetDocument"} ee = {args = {path = "/docs"} } |

The contents of the channels are then merged together in block 148 forming the reformed request 90 with the auth_token replaced with the user_id.

```
Request 90:    {device_id = "xyz",
                user_id = "joe",
                method_id = "GetDocument",
                args = {path = "/docs"}
                }
```

The personal client 40 processes the request 90 in block 150. Pursuant to the request 90, the personal client 40 retrieves the identified documents and then creates a reply transaction 91 (FIG. 5) in a manner similar to mobile device 21 formed request 90. For example, the retrieved documents are encrypted using the end-to-end security association between the personal client 40 and the mobile device 21, using EE key 46. Some or all of the control information in the reply 91 is encrypted using the point-to-point security association between the personal client 40 and the management server 28, which includes PP key 29. The reply 91 may look similar to the following.

```
Request 91:    {method_id = "GetDocumentResponse"
                args = {document = xxx,
                    size = 5123,
                    content_type = "text/plain",
                    name = "readme.txt"}
                }
```

According to the encryption schema, the method id may be encrypted using the PP key 29 and the remainder of the contents in reply 91 may be encrypted using the EE key 46.

Data Streaming

Figure 9:
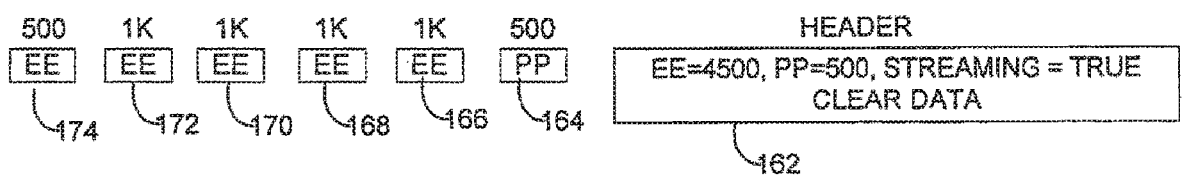
FIG. 9 shows how a large transaction is encoded into multiple packets.

Referring to FIG. 9, multiple packets 162-174 are used for transporting different portions of the same transaction 160. The multipacket transaction 160 may be used when one or more large documents are transferred between personal client 40 and the mobile device 21.

In one example, predetermined maximum packet length is configured to be 1000 bytes. If the transaction 160 is determined to be less than 1000 bytes, the contents of the clear, pp, and ee channels are encoded into a single packet. However, in this example, it is determined that 500 bytes of data exist in the pp channel and 4500 bytes of data exist in the ee channel. All the contents of the pp channel are encoded into a 500 byte packet 164. The data from the ee channel is encoded into four separate 1000 byte packets 166-174 and one 500 byte packet 174.

A header packet 162 is formed that identifies all the packets 162-174 as part of the same transaction 160. The data in the header packet 162 is unencrypted. Since the header packet 162 is unencrypted, it can also contain data from the clear channel. Alternatively, data from the clear channel can be encoded into a separate unencrypted packet. The header packet 162 identifies 500 bytes of data encrypted using the PP encryption key and 4,500 bytes of data encrypted using the EE encryption key.

The node receiving the message 160 reads the header 162 and determines the transaction 160 is a multipacket message (streaming=true). In one embodiment, the clear packet header 162 always comes first and is immediately followed by the pp packet 164. The pp packet 164 is immediately followed by .ee packets 166-174. This order can be guaranteed using protocols such as Transmission Control Protocol/Internet Protocol (TCP/IP). Transmitting the packets in this predetermined order eliminates having to attach labels to each packet to identify the type of encryption. Alternatively, sequence numbers can be assigned to the packets 162-174.

The node receiving transaction 160 may receive, decrypt and decode different portions of the transaction 160 at a time. For example, the processing node may first process the unencrypted clear data in the header packet 162 to determine if the transaction 160 is unauthorized. If the transaction is not authorized, the processing node can discard the remainder of the transaction 160 without having to decrypt and decode the pp packet 164 and ee packets 166-174.

If the information in the header packet 162 is authorized, the processing node decrypts and decodes data in the pp packet 164. If the data in the pp packet 164 is invalid or has been tampered with, the remaining ee packets 166-174 can be discarded without being further processed.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

We claim:

1. A method implemented on a first computer, the method comprising:
    encrypting first data of a first data path in a transaction using a first security association, wherein:
        the first data path is through an intermediary server that provides connectivity between the first computer and a second computer; and
        the transaction comprises a transaction message that includes control data and payload data;
    transmitting the control data to the intermediary server, wherein:
        the control data includes a token associated with the intermediary server;
        the token provides transaction routing information;
        the second computer receives the first data from the intermediary server; and
        the first data is decrypted;
    encrypting second data of a second data path using a second security association, wherein the second data path is distinct from the intermediary server; and
    transmitting the payload data through the second data path.

2. The method of claim 1, wherein the token is issued by the intermediary server.

3. The method of claim 1, wherein the first computer is a first mobile device.

4. The method of claim 3, wherein the first mobile device and the intermediary server are coupled over a mobile network.

5. The method of claim 4, wherein the mobile network provides an Internet protocol (IP) infrastructure of a wireless service provider.

6. The method of claim 4, wherein the first mobile device is a source for the transaction and the second computer is a target for the transaction.

7. The method of claim 6, wherein the transaction message includes a device identification associated with the second computer.

8. The method of claim 7, wherein the transaction message is modified by the first computer based on the device identification.

9. The method of claim 8, wherein the device identification is associated within the intermediary server to a third security association between the intermediary server and the second computer.

10. The method of claim 4, wherein the second computer is a personal computer.

11. A first computer having a processor configured for:
   encrypting first data of a first data path in a transaction using a first security association, wherein:
      the first data path is through an intermediary server that provides connectivity between the first computer and a second computer; and
      the transaction comprises a transaction message that includes control data and payload data;
   transmitting the control data to the intermediary server, wherein:
      the control data includes a token associated with the intermediary server;
      the token provides transaction routing information;
      the second computer receives the first data from the intermediary server; and
      the first data is decrypted;
   encrypting second data of a second data path using a second security association, wherein the second data path is distinct from the intermediary server; and
   transmitting the payload data through the second data path.

12. The first computer of claim 11, wherein the token is issued by the intermediary server.

13. The first computer of claim 11, wherein the first computer is a first mobile device.

14. The first computer of claim 13, wherein the first mobile device and the intermediary server are coupled over a mobile network.

15. The first computer of claim 14, wherein the mobile network provides an Internet protocol (IP) infrastructure of a wireless service provider.

16. The first computer of claim 14, wherein the first mobile device is a source for the transaction and the second computer is a target for the transaction.

17. The first computer of claim 16, wherein the transaction message includes a device identification associated with the second computer.

18. The first computer of claim 17, wherein the transaction message is modified by the first computer based on the device identification.

19. The first computer of claim 18, wherein the device identification is associated within the intermediary server to a third security association between the intermediary server and the second computer.

20. The first computer of claim 14, wherein the second computer is a personal computer.

21. A non-transitory computer-readable storage medium, the non-transitory computer-readable storage medium storing instructions to be implemented on a first computer including at least one processor, the instructions when executed by the at least one processor cause the first computer to perform a method, the method comprising:
   encrypting first data of a first data path in a transaction using a first security association, wherein:
      the first data path is through an intermediary server that provides connectivity between the first computer and a second computer; and
      the transaction comprises a transaction message that includes control data and payload data;
   transmitting the control data to the intermediary server, wherein:
      the control data includes a token associated with the intermediary server;
      the token provides transaction routing information;
      the second computer receives the first data from the intermediary server; and
      the first data is decrypted;
   encrypting second data of a second data path using a second security association, wherein the second data path is distinct from the intermediary server; and
   transmitting the payload data through the second data path.

* * * * *